(12) United States Patent  (10) Patent No.: US 7,685,802 B2
Feiz  (45) Date of Patent: Mar. 30, 2010

(54) METHODS AND APPARATUS TO FACILITATE GAS TURBINE FUEL CONTROL

(75) Inventor: Majid Feiz, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 472 days.

(21) Appl. No.: 11/612,907

(22) Filed: Dec. 19, 2006

(65) Prior Publication Data

US 2008/0147289 A1   Jun. 19, 2008

(51) Int. Cl.
 *F02C 9/00* (2006.01)
(52) U.S. Cl. .................. 60/39.281; 60/39.645; 60/772
(58) Field of Classification Search .................. 60/773, 60/776, 39.281, 39.645, 772
 See application file for complete search history.

(56) References Cited

U.S. PATENT DOCUMENTS

| | | | |
|---|---|---|---|
| 4,277,832 A * | 7/1981 | Wong | 700/282 |
| 5,274,996 A * | 1/1994 | Goff et al. | 60/790 |
| 6,065,283 A | 5/2000 | Shouman | |
| 6,364,602 B1 | 4/2002 | Andrew et al. | |
| 6,397,575 B2 | 6/2002 | Tomlinson et al. | |
| 6,543,234 B2 | 4/2003 | Anand et al. | |
| 6,608,395 B1 | 8/2003 | Steinway | |
| 6,894,403 B2 | 5/2005 | Shinogi | |
| 6,957,540 B1 | 10/2005 | Briesch et al. | |
| 7,107,774 B2 | 9/2006 | Radovich | |
| 2004/0050066 A1* | 3/2004 | Keller | 60/773 |
| 2007/0157619 A1* | 7/2007 | Feiz | 60/772 |
| 2008/0041063 A1* | 2/2008 | Feiz | 60/773 |

* cited by examiner

*Primary Examiner*—Michael Cuff
*Assistant Examiner*—Phutthiwat Wongwian
(74) *Attorney, Agent, or Firm*—Armstrong Teasdale LLP

(57) ABSTRACT

A method for controlling a dynamic response of a fuel control valve in a gas turbine fuel control system is provided. The method includes regulating a fuel supply pressure for a gas turbine using a component model, sensing a pressure of a fuel supply to the gas turbine, and applying a proportional plus integral control algorithm combined with a gas supply pressure feedforward signal to a pressure command signal controlling the fuel control valve to increase a system response in rejecting a pressure disturbance and increase a disturbance rejection bandwidth of a fuel control valve response.

6 Claims, 2 Drawing Sheets

METHODS AND APPARATUS TO FACILITATE GAS TURBINE FUEL CONTROL

BACKGROUND OF THE INVENTION

This invention relates generally to gas turbines and more particularly to fuel control systems used with gas turbines.

At least some known industrial gas turbine fuel control systems rely upon a steady fuel pressure, know as a P2 pressure, upstream of a set of parallel gas control valves for proper operation. To facilitate controlling the fuel pressure, at least some known gas turbine engines include a pressure control valve immediately upstream from the set of parallel gas control valves.

However, at least some engines using such fuel control systems still experience oscillating fuel pressures (P1) upstream from the parallel gas control valves. For example, a P2 oscillation induced by P1 supply pressure may result in a poor tracking action of the control system with the controlled parameter. In addition, such pressure oscillations may also be caused by variations in the gas fuel supply pressure, known as P1 pressure. Known control systems generally act solely on the P2 error, but have poor P1 disturbance rejection capability.

BRIEF DESCRIPTION OF THE INVENTION

In one aspect, a method for controlling a dynamic response of a fuel control valve in a gas turbine fuel control system is provided. The method includes regulating a fuel supply pressure for a gas turbine using a component model, sensing a pressure of a fuel supply to the gas turbine, and applying a proportional plus integral control algorithm combined with a gas supply pressure feedforward signal to a pressure command signal controlling the fuel control valve to increase a system response in rejecting a pressure disturbance and increase a disturbance rejection bandwidth of a fuel control valve response.

In another aspect, a control system is provided. The control system includes a component model configured to regulate a fuel supply for a gas turbine, a pressure sensor configured to sense a pressure of fuel supplied to the gas turbine, and a proportional plus integral controller combined with a gas supply pressure feedforward configured to provide a reference signal to the component model to facilitate increasing a system response in rejecting a pressure disturbance and increase a disturbance rejection bandwidth of a fuel control valve response.

In a further aspect, a gas turbine assembly is provided. The assembly includes a combustor configured to receive a flow of fuel from a fuel supply system through a fuel supply control valve, and a control system configured to facilitate controlling a dynamic response of the fuel supply control valve. The control system includes a processor configured to regulate a fuel supply pressure to the combustor using a component model, receive a pressure signal of the fuel supply to the combustor, and apply a proportional plus integral controller combined with a gas supply pressure feedforward to the component model to facilitate increasing a system response in rejecting a pressure disturbance and increasing a disturbance rejection bandwidth of a fuel supply control valve response.

DETAILED DESCRIPTION OF THE INVENTION

Figure 1:
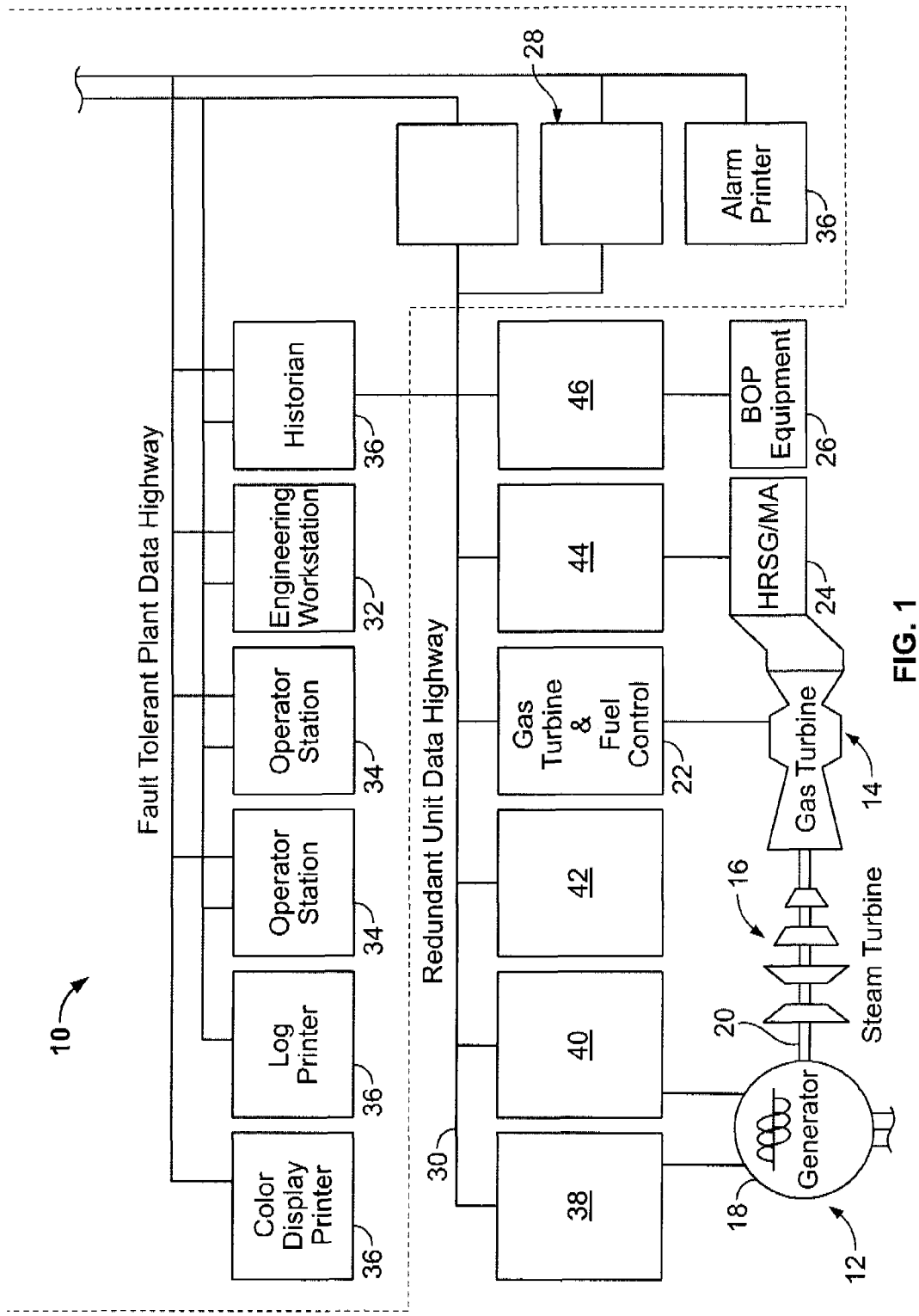
FIG. 1 is a schematic view of an exemplary control system that may be used with a power generation plant including a gas turbine engine.

FIG. 1 is a schematic view of an exemplary control system 10 that may be used with a power generation plant 12 including a gas turbine engine 14. In the exemplary embodiment, gas turbine engine 14 is coupled to a steam turbine 16 and to an electric power generator 18 through a monolithic shaft 20 in a combined cycle configuration. In various other embodiments, gas turbine engine 14 is coupled to a generator in a simple cycle gas turbine engine configuration. It should be noted that in other embodiments, gas turbine engine 14 is coupled to other prime movers in other configurations.

In the exemplary embodiment, gas turbine engine 14 is controlled by control system 10 through a gas turbine and fuel control subsystem 22. Other equipment such as steam turbine 16, a heat recovery steam generator 24, and the balance of plant equipment 26 are controlled by control system 10 through respective control subsystems in power generation plant 12. The respective subsystems are configured to communicate with sensors and control members (not shown) that are coupled to the equipment to provide signals that are a function of the operating parameters of the equipment. The subsystems for each unit communicate with each other and with a plant control system 28 through a unit data bus 30 which may be a single, a double redundant, or a triple redundant bus system. Plant control system 28 communicates with an engineering workstation 32, at least one operator workstation 34, and other display and human machine interfaces 36, such as, but not limited to, printers and a data historian that receives and stores data transmitted to it from respective subsystems coupled through unit data bus 30.

In the exemplary embodiment, the subsystems include for example, but are not limited to, a generator excitation and protection subsystem 38, a static starter subsystem 40, a steam turbine and bypass control subsystem 42, a heat recovery steam generator (HRSG) and steam cycle mechanical auxiliaries subsystem 44, and a unit auxiliary control subsystem 46.

Figure 2:
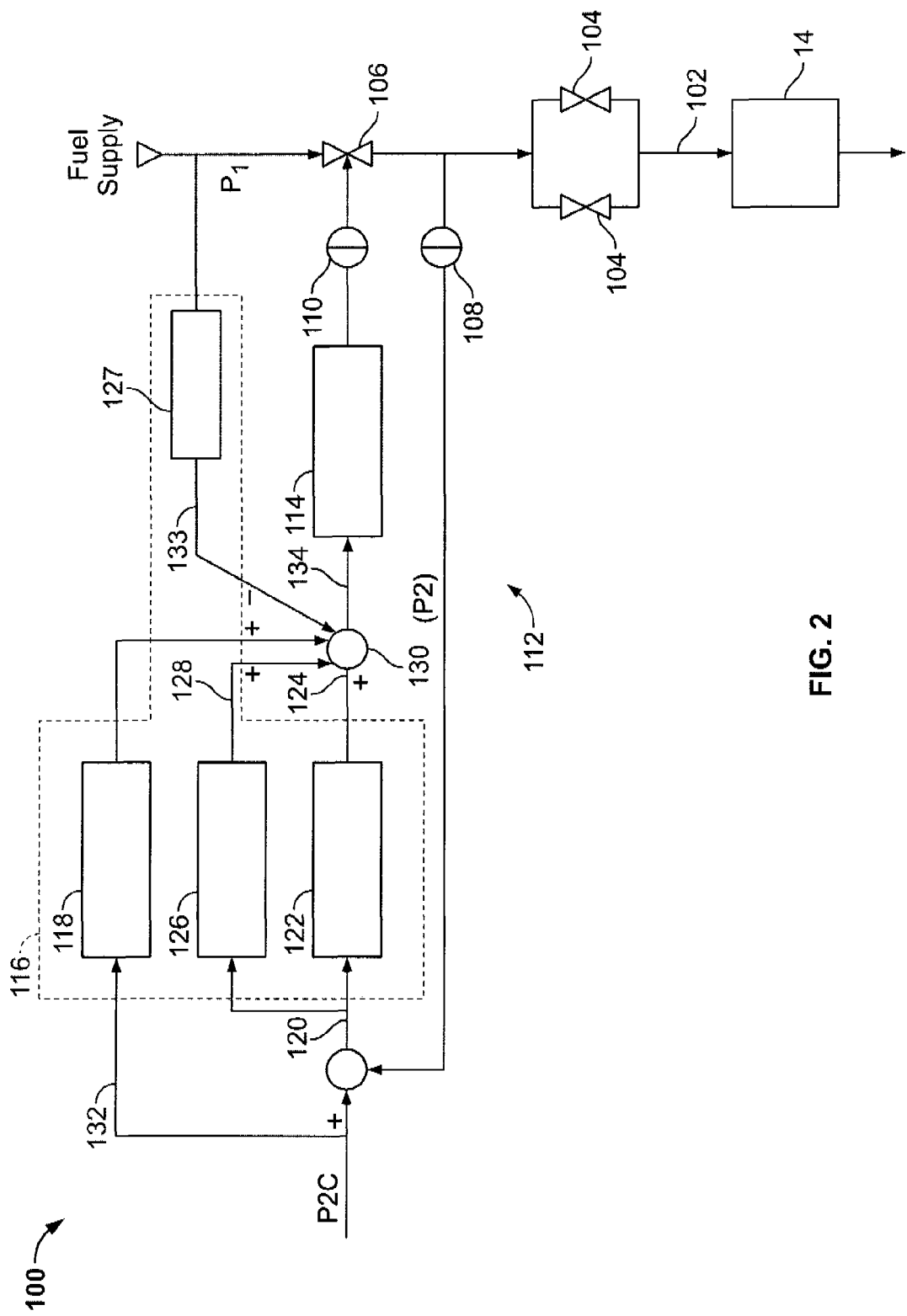
FIG. 2 is a schematic diagram of a portion of a control system that may be used with the gas turbine engine shown in FIG. 1

FIG. 2 is a schematic diagram of a gas turbine engine fuel control portion 100 of control system 10 (shown in FIG. 1) that may be used with gas turbine engine 14 (shown in FIG. 1). In the exemplary embodiment, gas turbine engine 14 receives a supply of fuel from one or more fuel distribution lines 102 that each include at least one fuel control valve 104 coupled thereto in flow communication. More specifically, in the exemplary embodiment, fuel flow channeled to fuel distribution lines 102 is discharged from a pressure control valve 106 coupled in flow communication upstream from fuel control valves 104. In the exemplary embodiment, an intervalve pressure sensor 108 is coupled in flow communication with the fuel supply, downstream from pressure control valve 106 and upstream from fuel control valves 104.

Fuel is supplied to pressure control valve 106 at a pressure P1 that is maintained to a desired pressure by control 106. Intervalve pressure sensor 108 generates an intervalve pressure signal P2 that is a function of the fuel control pressure downstream from pressure control valve 106. Operation of pressure control valve 106 is controlled by an actuator 110 coupled to pressure control valve 106. In one embodiment, actuator 110 is pneumatically activated. Actuator 110 is controlled from an output y of a gas turbine engine fuel control subsystem 112.

Gas turbine engine fuel control subsystem 112 includes a component model 114 that is programmed to represent a desired response of fuel supply components, including the valves, piping, and sensors, to process parameters affecting control system 10. Component model 114 also includes an integral plus state feedforward module 116 including a feedforward parameter 118. In the exemplary embodiment, feedforward module 116 is configured to provided a fuel intervalve pressure setpoint signal P2C to fuel control subsystem 112. Intervalve pressure signal P2 is the controlled parameter of fuel control subsystem 112. Fuel control subsystem 112 also includes an integrator 122 and a proportional 126 programmed to provide error signals within fuel control subsystem 112. Further, subsystem 112 includes a gain 127 to provided a gain of P1 to adjust the error signals.

In operation, intervalve pressure signal P2 and intervalve pressure setpoint signal P2C from control system 10 are summed to generate an error signal 120, which is fed into integrator 122 and integrated to produce an integrated error signal 124. Further, error signal 120 is also fed into proportional 126 and multiplied to produce a proportional error signal 128. Integrated error signal 124 and proportional error signal 128 are combined at a summer 130 to create an integrated/proportional error signal. A feedforward signal 132 indicative of intervalve pressure setpoint signal P2C is also fed to summer 130 and added to the integrated/proportional error signal to create a feedforward/integrated/proportional error signal 134. Further, a gain of pressure P1 133 is fed to summer 130 and subtracted to adjust feedforward/integrated/proportional error signal 134. The adjusted feedforward/integrated/proportional error signal 134 is transmitted to component model 114 for further processing to open or close control valve 106.

Specifically, in operation, a demand for fuel may change slowly as gas turbine engines being supplied the fuel increase mechanical output to supply increasing electrical load from, for example, an electrical power grid. Additionally, the demand for fuel may change rapidly, such as a step rise due to a rapid rise in electrical demand. Pressure sensor 108 senses the pressure change between valves due to the increased fuel demand. Intervalve pressure signal P2 is summed with the intervalve pressure setpoint PC2 received from control system 10. Error signal 120 is integrated and multiplied to provide an integrated error signal 124 and a proportional error signal 128, respectively. The resultant integrated error signal 124 and a proportional error signal 128 are summed and feedforward signal 132 is added to provide a processed error signal. The processed error signal is then adjusted by the gain of P1 and transmitted to component model 114. Component model 114 then applies the model parameters to the processed error signal to generate a control output y that is transmitted to actuator 110 to modulate pressure control valve 106 to adjust the intervalve fuel pressure back to the setpoint value. Using an integral plus state feedforward control circuit in gas turbine engine fuel control subsystem 112 provides an improved dynamic response over known fuel control systems. The improved dynamic response includes a smaller rise time in response to a step change in the controlled parameter and improved tracking action for higher frequency command reference signals.

In one embodiment, a method for controlling a dynamic response of a fuel control valve in a gas turbine fuel control system is provided. The method includes regulating a fuel supply pressure for a gas turbine using a component model, sensing a pressure of a fuel supply to the gas turbine, and applying a proportional plus integral control algorithm combined with a gas supply pressure feedforward signal to a pressure command signal controlling the fuel control valve to increase a system response in rejecting a pressure disturbance and increase a disturbance rejection bandwidth of a fuel control valve response.

Although described with respect to a gas fuel supply system, embodiments of the present invention are not intended to be so limited. Accordingly, fuel supply systems controlling other forms of fuel are also able to be used in other embodiments of the present invention. Moreover, references to a fuel control valve also include other fuel flow and pressure modulating devices such as dampers, conveyors, and variable speed fans and blowers.

A technical effect of the present invention is to facilitate reducing the effect of gas fuel system supply pressure variations on regulated gas intervalve pressure.

The above-described gas turbine engine fuel supply control sub-system is cost-effective and highly reliable. The subsystem permits an improved dynamic response for the fuel supply pressure control valve such that fuel supply pressure changes due to fuel demand changes are mitigated in a relatively shorter period of time. Accordingly, the gas turbine engine fuel supply control sub-system facilitates the operation of the gas turbine engine in a cost-effective and reliable manner.

While the invention has been described in terms of various specific embodiments, those skilled in the art will recognize that the invention can be practiced with modification within the spirit and scope of the claims.

What is claimed is:

1. A control system comprising:
   a component model configured to regulate a fuel supply for a gas turbine;
   at least one pressure sensor configured to sense a pressure of fuel supplied to the gas turbine;
   a proportional plus integral controller combined with a fuel supply pressure feedforward configured to provide a feedforward signal that represents a predetermined pressure setpoint for the control system; and
   a summer to configured to:
     sum an integral signal with a proportional signal to create an integral/proportional signal;
     add the feedforward signal to the integral/proportional signal to create a feedforward/integral/proportional signal;
     subtract a fuel supply pressure adjustment signal from the feedforward/integral/proportional signal; and
     transmit an adjusted feedforward/integral/proportional signal to the component model to facilitate increasing a system response in rejecting a pressure disturbance and increase a disturbance rejection bandwidth of a fuel control valve response.

2. A system in accordance with claim 1 wherein said control system further comprises interconnecting piping, wherein the fuel supply is coupled to the gas turbine via said interconnecting piping, and said at least one pressure sensor is coupled to the fuel supply via said interconnecting piping, wherein said component model is further configured to represent the response of said at least one pressure sensor and interconnecting piping in the fuel supply.

3. A system in accordance with claim 1 wherein said component model is further configured to represent the response of a plurality of components in the fuel supply.

4. A system in accordance with claim 1 wherein said proportional plus integral controller comprises an integrator configured to integrate a signal comprising a pressure feedback signal summed with the feedforward signal to create the integral signal.

5. A system in accordance with claim 1 wherein said proportional plus integral controller comprises a proportional configured to multiply a signal comprising a pressure feedback signal summed with the feedforward signal to create the proportional signal.

6. A system in accordance with claim 1 further comprising a fuel supply to the gas turbine engine that is controlled by an output of said component model.

* * * * *